(12) United States Patent
Johnson

(10) Patent No.: US 6,900,724 B2
(45) Date of Patent: May 31, 2005

(54) VIRTUAL ELECTRONIC BACK-UP ALIGNMENT APPARATUS

(75) Inventor: Keith R. Johnson, Orland Park, IL (US)

(73) Assignee: Bandwidth Design, Inc., Orland Park, IL (US)

(*) Notice: Subject to any disclaimer, the term of this patent is extended or adjusted under 35 U.S.C. 154(b) by 42 days.

(21) Appl. No.: 10/664,757

(22) Filed: Sep. 16, 2003

(65) Prior Publication Data

US 2005/0057345 A1 Mar. 17, 2005

(51) Int. Cl.$^7$ .................................................. G08B 21/00
(52) U.S. Cl. ....................................... 340/431; 280/477
(58) Field of Search .............................. 340/431, 435, 340/465; 116/28 R; 280/477

(56) References Cited

U.S. PATENT DOCUMENTS

| | | | |
|---|---|---|---|
| 3,981,544 A | * | 9/1976 | Tomecek et al. ........ 303/122.05 |
| 4,186,939 A | | 2/1980 | Woods et al. |
| 4,325,052 A | * | 4/1982 | Koerner ...................... 340/431 |
| 4,432,563 A | | 2/1984 | Pitcher |
| 4,938,495 A | | 7/1990 | Beasley et al. |
| 5,108,123 A | | 4/1992 | Rubenzik |
| 5,513,870 A | | 5/1996 | Hickman |
| 5,596,944 A | * | 1/1997 | Massie ..................... 116/28 R |
| 5,650,764 A | | 7/1997 | McCullough |
| 5,951,035 A | * | 9/1999 | Phillips et al. .............. 280/477 |
| 6,100,795 A | | 8/2000 | Otterbacher et al. |
| 6,139,041 A | | 10/2000 | Murphy |
| 6,178,650 B1 | * | 1/2001 | Thibodeaux ................. 33/286 |

* cited by examiner

Primary Examiner—John Tweel, Jr.
(74) Attorney, Agent, or Firm—Knechtel, Demeur & Samlan

(57) ABSTRACT

A virtual electronic back-up alignment apparatus that consists of a housing that provides a means for fixedly securing a light emitting source parallel to a vehicle and a means for activating the light emitting source and generating a light beam. A free rotating mirror assembly receives the light beam from the light emitting source and reflects the light beam into a directional guideline towards the trailer forming a virtual tow point for enabling the user to obtain the perfect alignment of the vehicle hitch to the trailer tow hitch. The free rotating mirror assembly comprises an orientation balancer, a mirror, and a pair of wheels encapsulated within a hollow, transparent tube secured to the housing for maintaining a parallel orientation between the light emitting source and the alignment point on the trailer.

27 Claims, 9 Drawing Sheets

VIRTUAL ELECTRONIC BACK-UP ALIGNMENT APPARATUS

I. FIELD OF THE INVENTION

The present invention relates to an apparatus for aligning a vehicle hitch to the tow hitch of a trailer and, more particularly, to an electronic back-up alignment apparatus that utilizes the combination of a light emitting source and reflective means for producing a directional guideline light beam for aligning the vehicle to the trailer.

II. DESCRIPTION OF THE PRIOR ART

For every vehicle that tows a trailer, the most difficult part is connecting the vehicle hitch to the tow hitch of a trailer. The vehicle hitch is typically installed to the vehicle frame centrally located at the rear of the vehicle and adjacent to the rear bumper. The tow hitch of the trailer is centrally located in the front of the trailer and in the approximate horizontal plane above the ground as the vehicle hitch. The reason the connection of the vehicle to the trailer presents such difficulty is because neither the vehicle hitch nor the trailer tow hitch are visible to the driver of the vehicle when attempting to align the vehicle for connection to the trailer. As a result, the driver's blind alignment of these two hitches for connection to one another imposes an imprecise, arduous task.

In the past, there have been a number of devices developed to solve this problem. These include U.S. Pat. No. 6,139,041 to Murphy entitled "Trailer Hitching Alignment Aid"; U.S. Pat. No. 5,108,123 to Rubenzik entitled "Vehicle Docking Device Using Sensor Matrix"; U.S. Pat. No. 5,513,870 to Hickman entitled "Guidance System For Use In Docking A Movable Vehicle With A Stationary Target"; U.S. Pat. No. 6,100,795 to Otterbacher entitled "Trailer Hitch Alignment System"; U.S. Pat. No. 4,186,939 to Woods entitled "Electro-Mechanical Docking Apparatus and Method"; U.S. Pat. No. 4,432,563 to Pitcher entitled "Hitching Guidance Device", U.S. Pat. No. 4,938,495 to Beasley entitled "Trailer Hitch Positioning Apparatus"; U.S. Pat. No. 5,650,764 to McCullough entitled "Trailer Alignment Device With Visual Display". However, none of these devices disclose, teach or use a transportable apparatus, attachable to a vehicle, that utilizes a light source coacting with a gravity leveling reflective device for providing a directional beam which is visible by the driver for aligning the hitch of a vehicle to the tow hitch of a trailer.

Thus, there is a need and there has never been disclosed Applicant's electronic back-up alignment apparatus.

III. OBJECTS OF THE INVENTION

It is the primary object of the present invention to provide a means for a driver to align the hitch of a vehicle to the tow hitch of a trailer. A related object of the present invention is to provide a light source and optional reflective surface for providing a directional light beam and virtual tow point to guide the proper alignment of the vehicle and trailer.

Another related object of the invention is to provide an apparatus and a directional light beam or virtual tow point that is visible to the driver of the vehicle.

Another object of the present invention is to provide an apparatus that can be used by one person for properly aligning the vehicle with the trailer. A related object of the invention is to permit the apparatus to be used by the person who is operating the vehicle and backing it toward the trailer.

Another object of the invention is to provide an apparatus that reduces the time and energy to align the vehicle hitch with the trailer tow hitch. A related object of the invention is to reduce the accidents and injuries caused when vehicle hitches are not properly aligned with the tow hitch of the trailers.

Still another object of the invention is to provide a device that is safe and easy to use.

Other objects of the present invention will become more apparent to persons having ordinary skill in the art to which the present invention pertains from the following description taken in conjunction with the accompanying drawings.

IV. SUMMARY OF THE INVENTION

The present invention is an electronic back-up alignment apparatus that consists of a housing that provides a cylindrical column for fixedly securing a light emitting source parallel to a vehicle. The cylindrical column has a slip ring to engage a light source actuator on the light emitting source for activating the light emitting source and generating a light beam. A free rotating mirror assembly receives the light beam from the light emitting source and reflects the light beam into a directional guideline towards the trailer and forms a virtual tow hitch point for enabling the user to obtain the perfect alignment of the vehicle hitch to the trailer tow hitch. The free rotating mirror assembly comprises a gravity orientation balancer, a mirror, and a pair of bearing wheels encapsulated within a hollow, transparent tube secured to the housing.

V. BRIEF DESCRIPTION OF THE DRAWINGS

The Description of the Preferred Embodiment will be better understood with reference to the following figures.

VI. DETAILED DESCRIPTION OF THE PREFERRED EMBODIMENT

Figure 1:
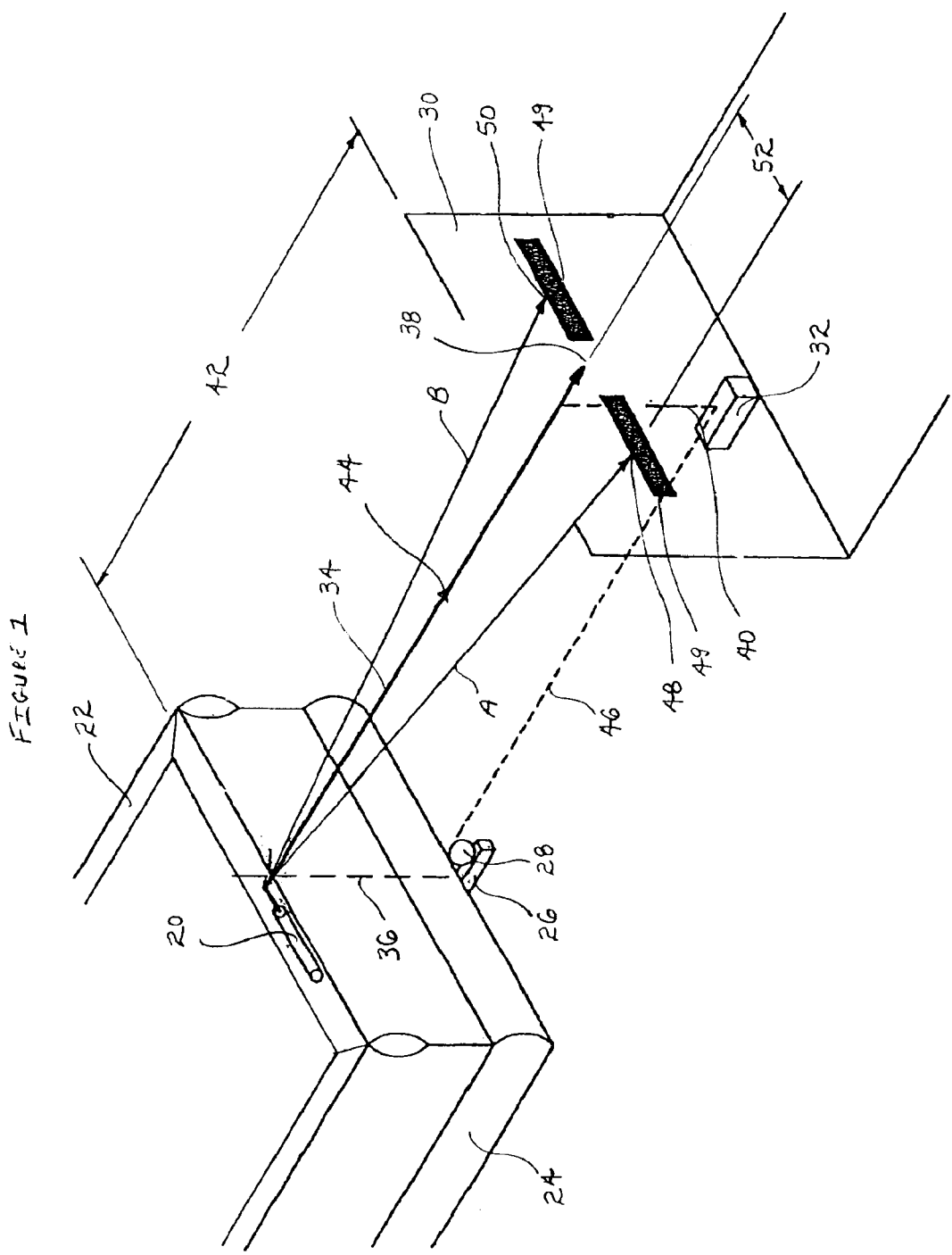
FIG. 1 is a front perspective view illustrating the electronic back-up alignment apparatus being used, in this example, for aligning a vehicle hitch to the tow hitch of a trailer.

Turning first to FIG. 1, there is illustrated an electronic back-up alignment apparatus 20. In the preferred embodiment, the electronic back-up alignment apparatus 20 is positioned on a tailgate ledge 22 of a truck bed 24 of a vehicle (not illustrated). Alternatively, the electronic back-up alignment apparatus 20 may be positioned on the vertical portion of the tailgate. The truck bed 24 provides a hitch 26 and a hitch ball 28. The truck bed 24 of the vehicle is shown backing up in the direction towards a trailer 30. The trailer 30 provides a tow hitch 32 for receiving the hitch ball 28 of the hitch 26 of the vehicle. The tow hitch 32 is located in the front of and at the base of the trailer 30. As situated, the tow hitch 32 is positioned in the approximate horizontal plane, in relation to the ground, to correspondingly receive the hitch ball 28 when the hitch 26 and the tow hitch 32 are properly aligned for assembly. Upon connecting the hitch 26 with the tow hitch 32, the vehicle is ready to pull the trailer 30. Applicant's electronic back-up alignment apparatus 20 is a directional alignment device designed to enable a user to properly align the hitch 26 of the vehicle with the tow hitch 32 of the trailer 30 and, thereby, facilitate connecting the hitch 26 and tow hitch 32 for towing the trailer 30.

The electronic back-up alignment apparatus 20 is preferably for use by the driver of the vehicle and may be used in connection with any type vehicle including but not limited to a truck, van, car, recreational vehicle, etc . . . , that contains any type of hitch 26 which connects to a tow hitch 32 on any type of trailer, towing device, or otherwise.

In use, the electronic back-up alignment apparatus 20 generates a reflected light beam 34. The light beam 34 originates from the electronic back-up alignment apparatus 20 and leaves the truck bed 24 from a vertical centerline plane 36 which passes through the hitch 26. The light beam 34 generates a directional guideline 44 that extends from the truck bed 24 to the trailer 30. When the light beam 34 reaches the trailer 30, the light beam 34 creates a virtual tow point 38 on the trailer 30. In the preferred embodiment, the virtual tow point 38 on the trailer 30 is in a vertical centerline plane 40 that passes through the tow hitch 32. In this position, the hitch ball 28 of the hitch 26 of the vehicle is in "perfect alignment" with the tow hitch 32 of the trailer 30. This is represented by perfect line 46. The directional guideline 44 generated by the light beam 34 and the virtual tow point 38 are visual to the human eye. The light beam 34 travels a closing distance 42 which represents the distance between the truck bed 24 of the vehicle and the trailer 30. As the vehicle backs up and moves in the direction towards the trailer 30, the closing distance 42 will decrease until the hitch ball 28 of the hitch 26 is in position to be received by the tow hitch 32 of the trailer 30.

If the virtual tow point 38 is not in the vertical centerline plane 40, then the vehicle is moving in a direction towards the trailer 30 in which the hitch 26 is not properly aligned with the tow hitch 32. If the vehicle is moving toward the right side of the trailer 30 and tow hitch 32 (as viewed from the driver of the vehicle), the directional guideline 44 of the light beam 34 will generate path A and display an off-center virtual tow point 48. If the vehicle is moving toward the left side of the trailer 30 and tow hitch 32 (as viewed from the driver of the vehicle), the directional guideline 44 of the light beam 34 will generate path B and display an off-center virtual tow point 50. Upon seeing path A or B of the directional guideline 44 and the resulting off-center virtual tow points 48 or 50, the driver will realize that the vehicle is not approaching the trailer 30 in perfect alignment between the hitch 26 and the tow hitch 32. As a result, the hitch 26 is misaligned from the tow hitch 32 an off-center distance 52.

In the path A example, to reposition the vehicle to obtain the perfect alignment, the driver must turn the vehicle and the hitch 26 left such that path A moves in the direction toward the directional guideline 44 and the perfect line 46 until the off-center distance 52 is reduced to zero. Upon reaching an off-center distance 52 of zero, path A overlies directional guideline 44 and the off-center virtual tow point 48 becomes the virtual tow point 38. In the path B example, the driver turns the vehicle in the opposite direction or to the right to obtain the same result. Thus, in each instance, the "perfect alignment" between the vehicle and the trailer is again realized. The driver continues to adjust the vehicle to maintain the perfect alignment until the hitch 26 is correspondingly aligned for connection to the tow hitch 32.

Alternatively, it is contemplated that off-center virtual tow points 48 or 50 may engage a reflective material 49 provided on the trailer 30 to further assist the user or as an indication to the user that the vehicle is misaligned with the trailer 30. The reflective material 49 may be any color or multitude of colors, as desired. The reflective material 49 may be affixed to the trailer 30 by any means including but not limited to magnets, adhesive tape, glue, etc . . .

Figure 2:
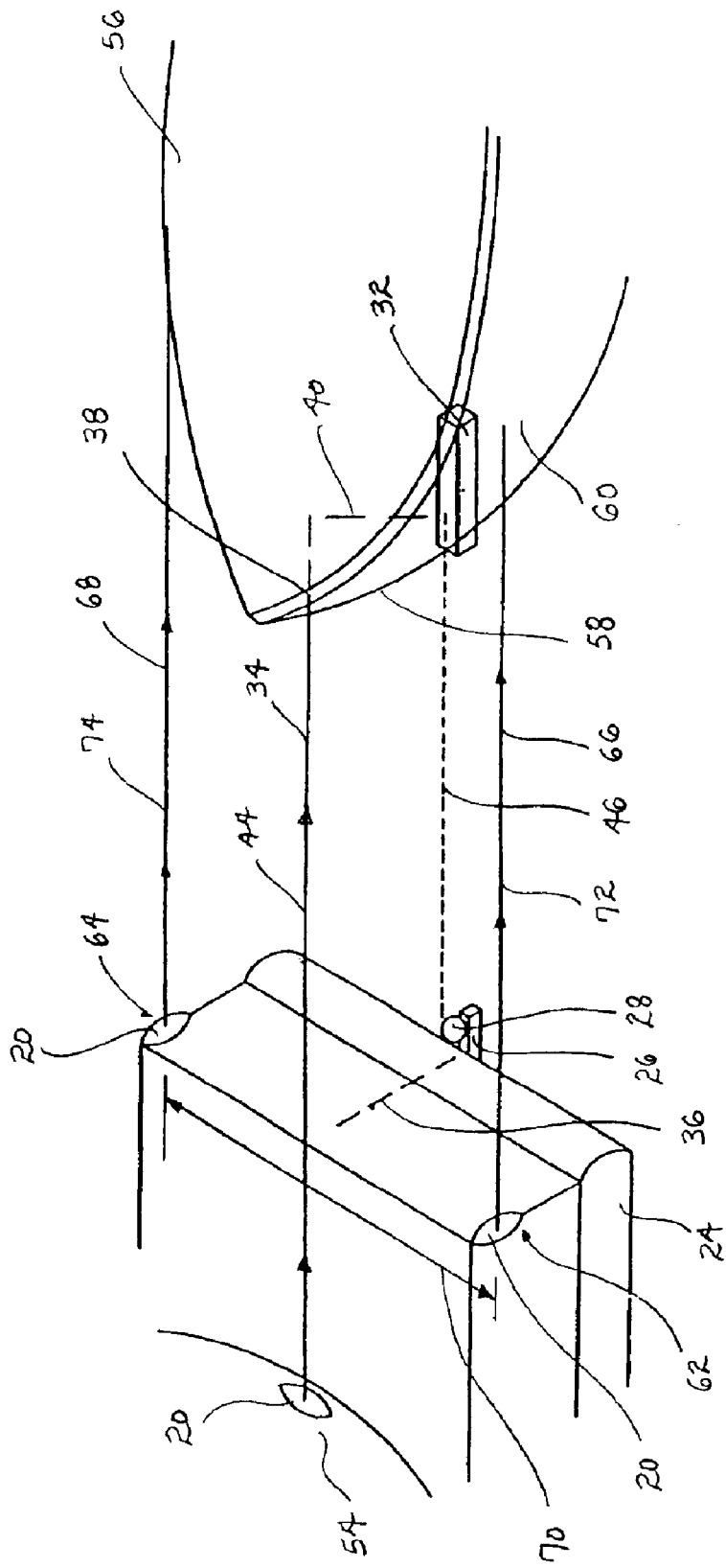
FIG. 2 is a side perspective view of an alternate embodiment of the electronic back-up alignment apparatus in which multiple directional light beams are used for back-up alignment of a vehicle hitch to the tow hitch of a boat.

Turning to FIG. 2, an alternate embodiment of the electronic back-up alignment apparatus 20 is illustrated. The electronic back-up alignment apparatus 20 is alternately located along the inside ledge of the back window of the vehicle referred to as alternate position 54. The alternate position 54, as in the original embodiment, generates a light beam 34 along directional guideline 44 in the same horizontal plane as the perfect line 46 thereby continuing to produce the "perfect alignment." Also, in this embodiment, the vehicle is being aligned with a trailer (not illustrated) that contains a tow hitch 32 for pulling a boat 56. The virtual tow point 38 created by the light beam 34 engages the boat 56 along the boat's centerline 58. Like in the original embodiment, the boat's centerline 58 is positioned in the same vertical centerline plane 40 as the tow hitch 32.

As the boat 56 has a receding and arcing front surface 60 which is not flat or perpendicular to the line of sight of the driver of the vehicle as the trailer 30 in the original embodiment, this alternate embodiment may further include multiple directional light beams for aligning the vehicle to the tow hitch 32 for the boat 56. The electronic back-up alignment apparatus 20 is located in the alternate position 54 and has additional alignment apparatus 20 located in the rear taillight assemblies of the vehicle at positions 62 and 64. At positions 62 and 64, the electronic back-up alignment apparatus 20 will generate light beams 66 and 68, respectively. The generated light beams 66 and 68 define width 70 of the truck bed 24. As a result, with the electronic back-up alignment apparatus 20 located at alternate position 54, position 62, and position 64, the driver is provided with a directional guideline 72 defining the left side of the truck bed 24, the directional guideline 44 defining the center of the truck bed 24, and a directional guideline 74 defining the right side of the truck bed 24. When each of the guidelines are in the correct position as illustrated, the hitch 28 of the hitch 26 of the vehicle is in "perfect alignment" with the tow hitch 32 of the trailer for the boat 56.

Figure 3:
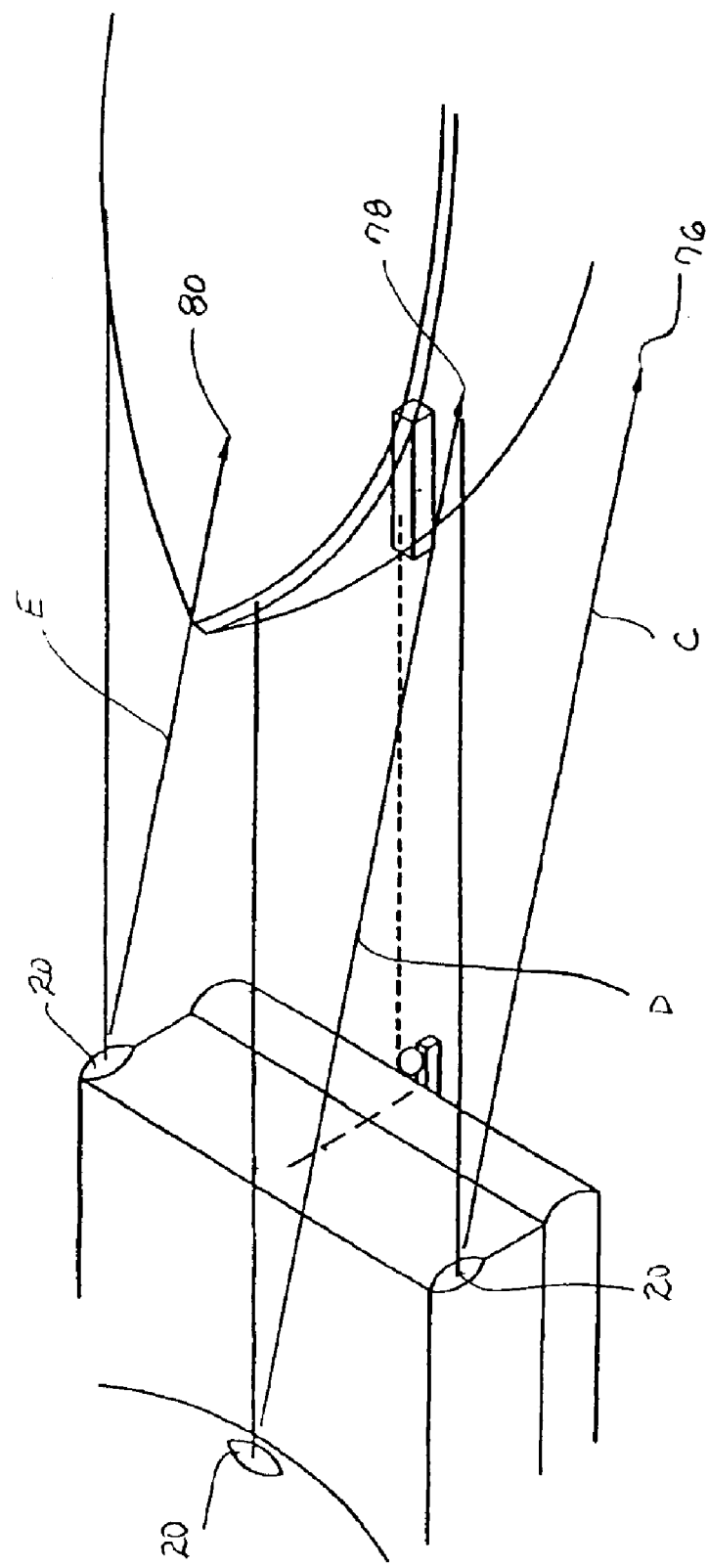
FIG. 3 is a side perspective view of the alternate embodiment of FIG. 2 depicting the directional guidelines and off-center virtual tow hitch points when the vehicle hitch is not in perfect alignment with the hitch of the boat.

If the virtual tow point 38 is not in the vertical centerline plane 40 and parallel to the perfect line 46, then the vehicle is again moving in a direction towards the boat 56 in which the hitch 26 is not properly aligned with the tow hitch 32 of the trailer. When this occurs, if the vehicle is moving toward the right side of the tow hitch 32 or boat centerline 58 (as viewed from the driver of the vehicle), the directional guidelines 72, 44, and 74 will produce paths C, D, and E, respectively, and display off-center virtual tow points 76, 78, and 80, as illustrated in FIG. 3. Upon seeing any of the paths C, D, or E of the directional guidelines 72, 44, or 74, and the resulting off-center virtual tow points 76 (this point is not visible as it misses the boat and does not strike anything), 78, or 80, the driver will realize that the vehicle is not approaching the boat 56 in perfect alignment between the hitch 26 and the tow hitch 32. As a result, the driver must then reposition the vehicle to the perfect alignment as previously discussed.

Figure 4:
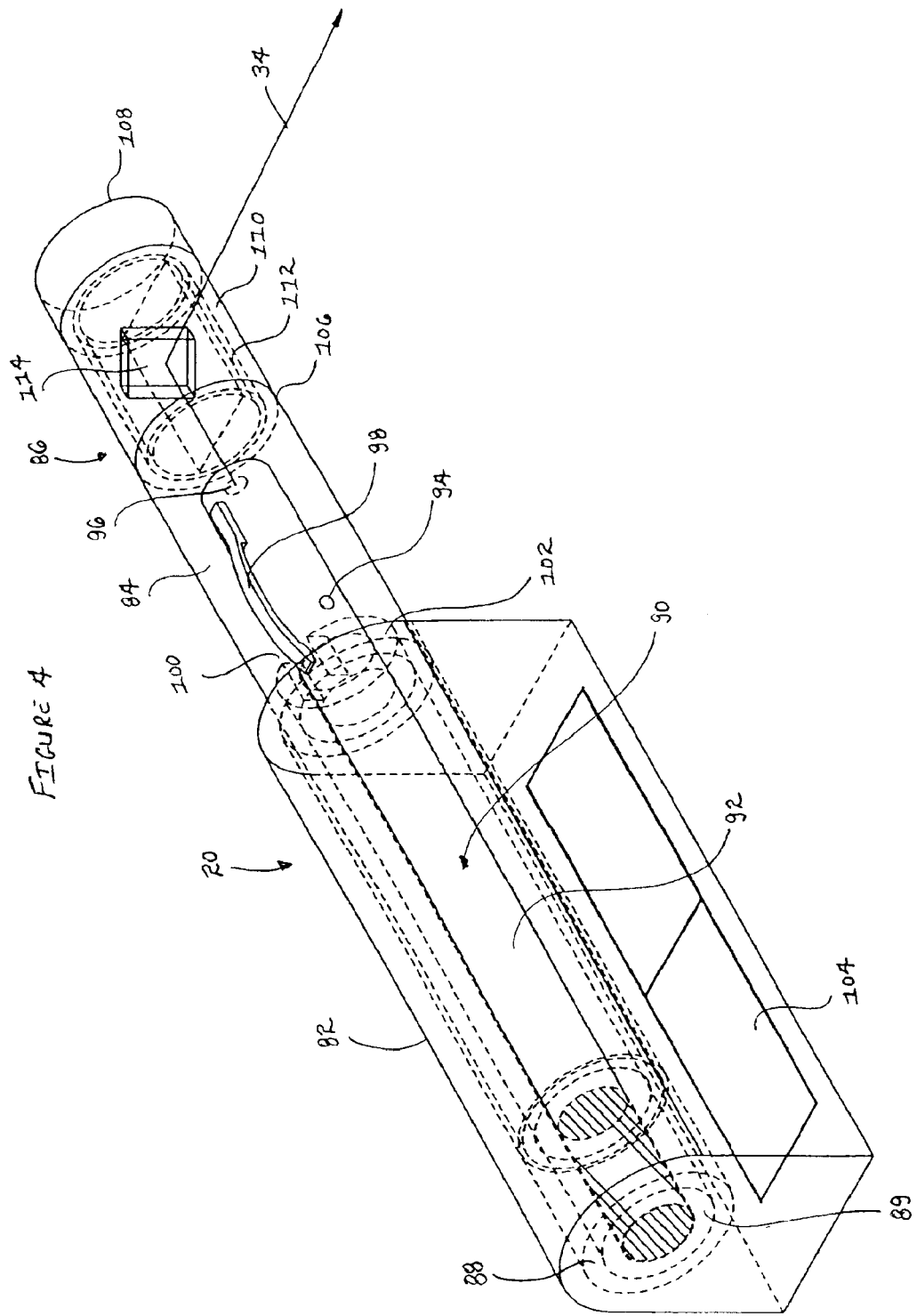
FIG. 4 is a front perspective view depicting the assembled electronic back-up alignment apparatus.

Turning to FIG. 4, the components of the electronic back-up alignment apparatus 20 are more clearly shown. The electronic back-up alignment apparatus 20 comprises a housing 82, a light emitting source 90, a light source cover 84, and a free rotating mirror assembly 86.

The housing 82 provides a cylindrical column 89 to receive the light emitting source 90. The cylindrical column 89 secures the light emitting source 90 by set screws (not illustrated). Alternatively, it is contemplated that a person skilled in the art may utilize any known means or method for securing the light emitting source 90 within the cylindrical column 89. The cylindrical column 89 is encapsulated by a cylindrical bore 88 that frictionally receives the light source cover 84 which also provides a cover for the light emitting source 90.

In the preferred embodiment, the light emitting source 90 is a standard, off the shelf laser pointer, Model LS-11, manufactured by Limate Corporation located in Taipei, Taiwan. The light emitting source 90 has an elongated body 92 with a light source actuator 94 to active the light beam 34 and a lens opening 96 to release the light beam 34 when activated. As the light emitting source 90 is a standard off the shelf device that may be used as a pointing device for speeches and otherwise, the light emitting source 90 is predisposed with a clip 98. To accommodate the clip 98, the cylindrical column 89 is provided with a slot 100 in a slip ring 102 located at the adjacent end of the cylindrical column 89. Alternatively, it is contemplated that any light emitting source 90 currently available to the public may be utilized provided the light emitting source 90 functions as described herein. As a further alternative, the light emitting source 90 may be an incandescent light source, a light emitting diode light source, or any other type of light source currently available and known to the public provided that it functions in the manner described herein.

The housing 82 secures the light emitting source 90 in a fixed position on the vehicle. In the preferred embodiment, the light emitting source 90 is situated parallel to the vehicle in relation to the trailer 30. In the preferred embodiment, the light source cover 84 traverses from a closed position, as illustrated in FIG. 4, in which the light source actuator 94 is exposed to an open position, in which the light source actuator 94 is covered by the slip ring 102. The light source cover 84 also provides protection for the light emitting source 90 from damage by any external forces. In the closed position, as the light source actuator 94 is not activated, the light emitting source 90 does not emit the light beam 34. Upon the light source cover 84 traversing from the closed position to the open position, the slip ring 102 slides along the exterior of the light emitting source 90 until the slip ring 102 covers the light source actuator 94. When the slip ring 102 covers the light source actuator 94, the slip ring 102 depresses the light source actuator 94 into the light emitting source 90 to activate the light emitting source 90. When activated, the light beam 34 is generated and released from the light emitting source 90 through the lens opening 96 and into the free rotating mirror assembly 86. When the user desires to deactivate the light emitting source 90, the light source cover 84 is traversed back to the closed position, thereby, uncovering the light source actuator 94 and disengaging the slip ring 102 from the light source actuator 94. As the light source actuator 94 is uncovered and disengaged with the slip ring 102, the light source actuator 94 is released from the light emitting source 90.

Figure 5:
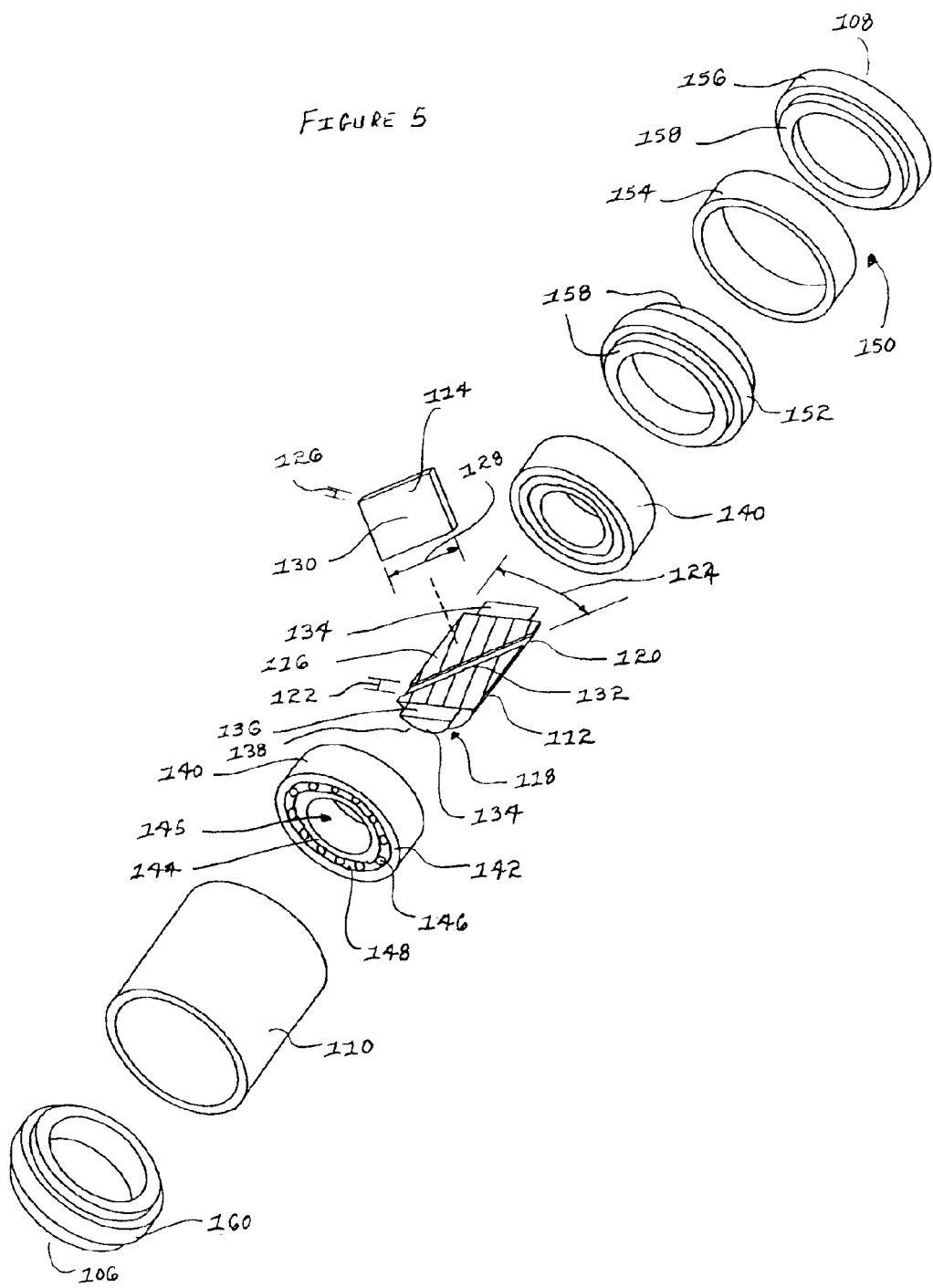
FIG. 5 is an exploded view of FIG. 4, with portions removed, of the free rotating mirror assembly.

The free rotating mirror assembly 86 that receives the light beam 34 has a proximal end 106 and a distal end 108 separated by a clear tube 110. Encapsulated within the clear tube 110 is a gravity orientation balancer 112 and a mirror 114. A detached, exploded view of the free rotating mirror assembly 86 is more fully illustrated in FIG. 5.

At the core of the free rotating mirror assembly 86 is the gravity orientation balancer 112 and the mirror 114. The orientation balancer 112 is a half moon shaped member with a top surface 116. In the preferred embodiment, the top surface 116 is flat with a channel 120. The channel 120 has a channel width 122 and extends diagonally across the flat top surface 116 at angle 124. In the preferred embodiment, the angle 124 is substantially 45 degrees. This causes the light beam 34 which is received into the free rotating mirror assembly 86 to be reflected by the mirror 114, discussed below, directly towards the trailer 30. The mirror 114 has a mirror thickness 126 that is slightly less than the channel width 122 such that the mirror 114 is frictionally received and retained into the channel 120. The mirror 114 also has a mirror length 128 that extends along the channel 120 but does not exceed the length of the channel 120. The mirror 114 has a mirror centerpoint 130. In the preferred embodiment, the mirror 114 is received into the channel 120 such that the mirror centerpoint 130 is at the approximate location of the centerpoint 132 of the channel 120 which also corresponds to the centerpoint of the orientation balancer 112. As the mirror 114 and the orientation balancer 112 share the same centerpoints, once the mirror 114 is received into the channel 120, the orientation balancer 112 will continue to maintain a balanced equilibrium in which the top surface 116 of the orientation balancer will be parallel to the ground. The balanced equilibrium of the free rotating mirror assembly 96 is discussed in further detail below.

Extending outwardly from each side of the orientation balancer 112 are identical arms 134. Each arm 134 is half moon shaped and has an arm top surface 136 and a bottom surface 118 with an arc 138. The top surface 136 of the arm 134 and the top surface 116 of the orientation balancer 112, in the preferred embodiment, forms one complete flat surface.

Located adjacent to the orientation balancer 112 are identical wheels 140. Each wheel 140 has an outside tube 142, a center tube 144, and a wheel opening 145. The outside tube 142 and the center tube 144 are separated by ball bearings 146 and ball bearing dividers 148.

Figure 6:
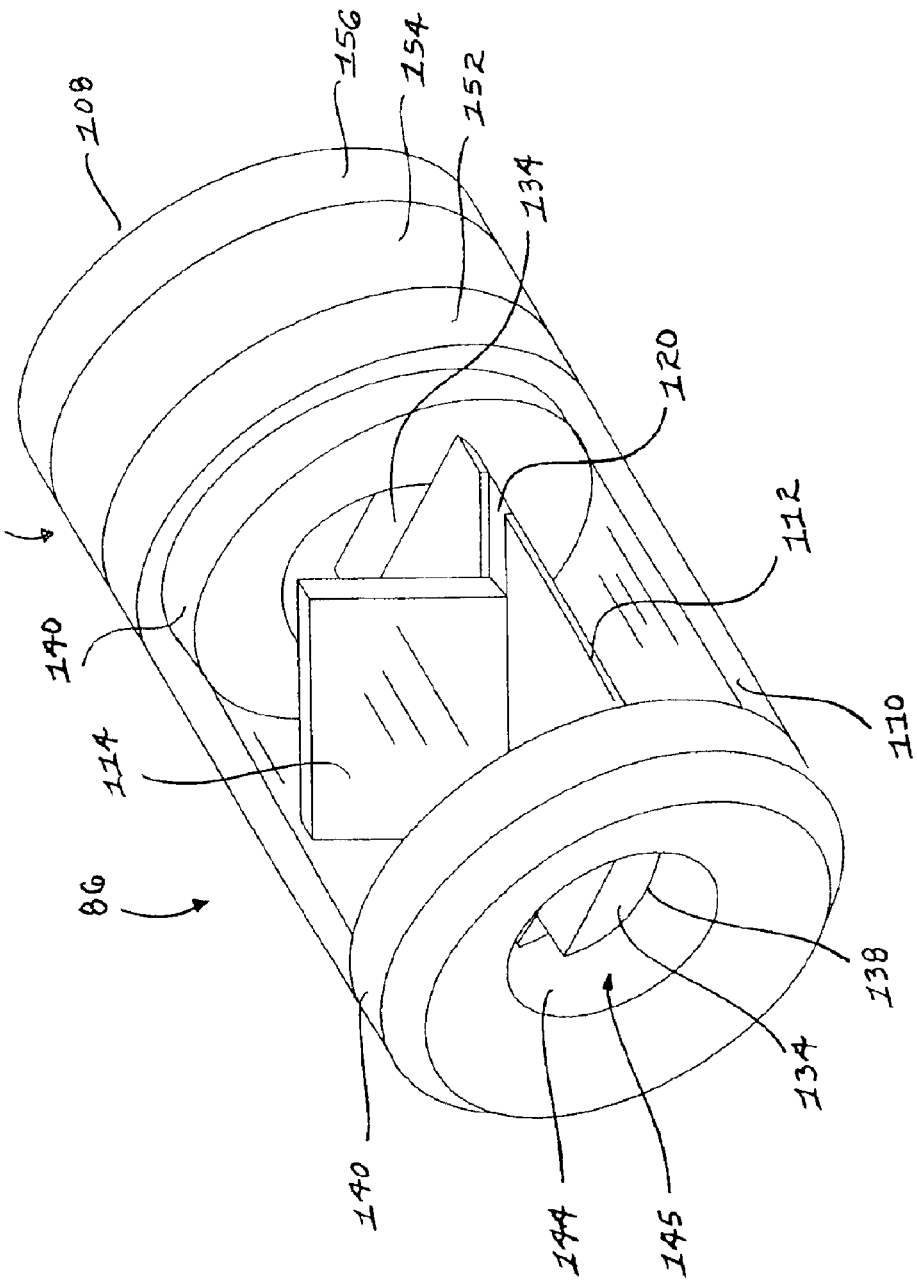
FIG. 6 is a perspective view of the assembled free rotating mirror assembly.

To assemble the free rotating mirror assembly 86 as illustrated in FIG. 6, the mirror 114 is first inserted and frictionally received into the channel 120 of the orientation balancer 112. Each arm 134 of the orientation balancer 112 is then received into the wheel opening 145 of the wheels 140 with the arc 138 of the bottom surface 118 being secured to the inside of the center tube 144. The bottom surface 118 is preferably secured to the center tube 144 by glue. Alternatively, the bottom surface I 18 may be secured to the center tube 144 by any known means or method publicly available provided that the orientation balancer 112 remains in a fixed position relative to the center tube 144. The mirror 114, the orientation balancer 112, and the wheels 140 are received into and encapsulated by the clear tube 110. At the distal end 108 of the free rotating mirror assembly 86, an end cap 150 closes the components within the clear tube 110. The end cap 150 consists of a connection member 152, a ring 154, and a stopper 156. The connection member 152 and the stopper 156 are each provided with ledges 158 that are frictionally received by the wheel 140 and ring 154, respectively, for securing the connection member 152 to both the wheel 140 and the stopper 156, thereby, forming the end cap 150. An identical connection member 160 is likewise used to secure the proximal end 106 of the free rotating mirror assembly 86 to the light source cover 84 or housing 82.

As the vehicle backs up towards the trailer, the vehicle will most likely encounter aberrant or uneven terrain. The electronic back-up alignment apparatus 20 and, more specifically, the free rotating mirror assembly 86 automatically corrects for such terrain and continually maintains the guideline 44 in a horizontal plane in relation to the ground. In this manner, the directional guideline 44 will always be directed towards the trailer 30 for producing the virtual tow point 38.

For example, while in the perfect alignment, when the vehicle encounters a dip in the terrain, the truck bed 24 will likewise accommodate the dip and thereby attempt to force the electronic back-up alignment apparatus 20, the directional guideline 44, and virtual tow point 38 to point in a direction towards the ground and, consequently, out of sight of the user and not towards the trailer. The free rotating mirror assembly 86 counters this to keep the directional guideline 44 in a horizontal plane in relation to the ground and provide a useful virtual tow point 38. As the dip occurs, the orientation balancer 112 and the center tube 144 within the wheel 140 begin to correspondingly rotate in the opposite direction of the direction of the vehicle and truck bed 24. As the orientation balancer 112 is fixedly secured to the center tube 144 by arms 134, the weight of the gravity orientation balancer 112 counters the rotation of the electronic back-up alignment apparatus 20 (i.e., which is fixedly secured to the vehicle by the housing 82) and forces the ball bearings 146 in the wheels 140 in the opposite direction of the electronic back-up alignment apparatus 20 to keep the orientation balancer 112 and the mirror 114 in a position parallel to the ground and directly facing the trailer 30. Despite any and all fluctuations to the vehicle, the electronic back-up alignment apparatus 20 continually adapts to the aberrant or uneven terrain to produce a directional guideline 44 in a horizontal plane and a virtual low point 38 for aligning the vehicle to the trailer 30 and maintaining the perfect alignment.

In the above analysis, the ground is assumed to be relatively flat which the exception of the aberrant or uneven terrain encountered between the vehicle and the trailer. If, however, the ground is at a high angle to the horizontal plane such as that produced by a hill, the vehicle will either be in a position higher than the trailer (i.e., if the vehicle is backing down the hill towards the trailer) or a position lower than the trailer (i.e., if the vehicle is backing up the hill towards the trailer). In either of these positions, as the free rotating mirror assembly 86 maintains the guideline 44 in a horizontal plane, the virtual tow point 38 may not be visible on the trailer 30 until the vehicle approaches to the trailer 30 such that the trailer 30 is within the horizontal plane of the electronic back-up alignment apparatus 20. In these situations, the distance between the vehicle and the trailer 30 where the trailer 30 is within the horizontal plane is dependent upon the height of the trailer 30 or boat 56.

Magnets 104 (FIG. 4) located in the base of the housing 82 are provided to secure the electronic back-up alignment apparatus 20 to the truck bed 24 or at any other desired location on the vehicle for use. Alternatively, it is contemplated that any known means or method may be utilized to secure the electronic back-up alignment apparatus 20 to the vehicle.

Figure 7:
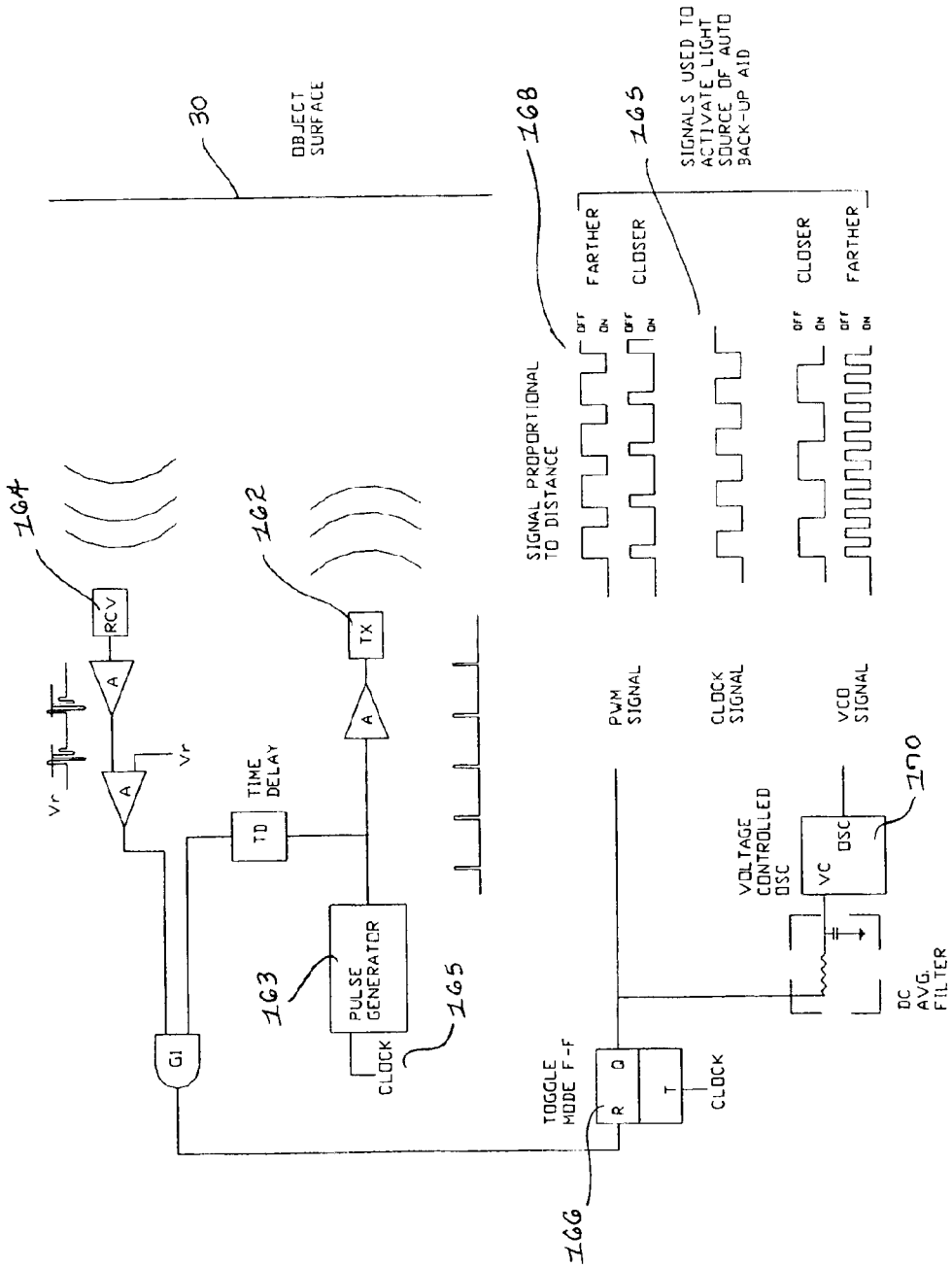
FIG. 7 is an electrical schematic diagram of the invention further comprising a sonar or anti-collision system and how it can be used to activate the electronic back-up alignment apparatus.

The electronic back-up alignment apparatus 20 described herein may further be enhanced with a device for measuring the distance between the vehicle and the trailer 30 such as a sonar or anti-collision system as illustrated in FIG. 7. A transmitter 162 sends a signal in the direction of an object surface or the trailer 30. The transmitted signal is derived from a clock driven pulse generator 163 and is synchronous with the leading edge of the clock signal 165. The transmitted signal is reflected from the object surface or the trailer 30 and transformed into a reflected signal which is detected by a suitable receiver 164. The reflected signal is converted into a signal pulse to reset a toggle mode flip-flop circuit 166. The distance between the vehicle and the trailer 30 is derived from the travel time to and from the trailer 30 and is represented by a pulse-width modulated signal 168. As depicted, the pulse-width modulated signal 168 has a shorter duty cycle for close distances and a longer duty cycle for longer distances. This signal is then used to turn the light emitting source 90 on and off and indicating a closer or farther distance by the apparent intensity of the light beam. Alternatively, it is contemplated that the pulse-width modulated signal can be filtered to obtain a direct current average voltage for varying the frequency of a voltage controlled oscillator 170. In this manner, the distance information can be provided as a function of the light source pulse rate.

Figure 8:
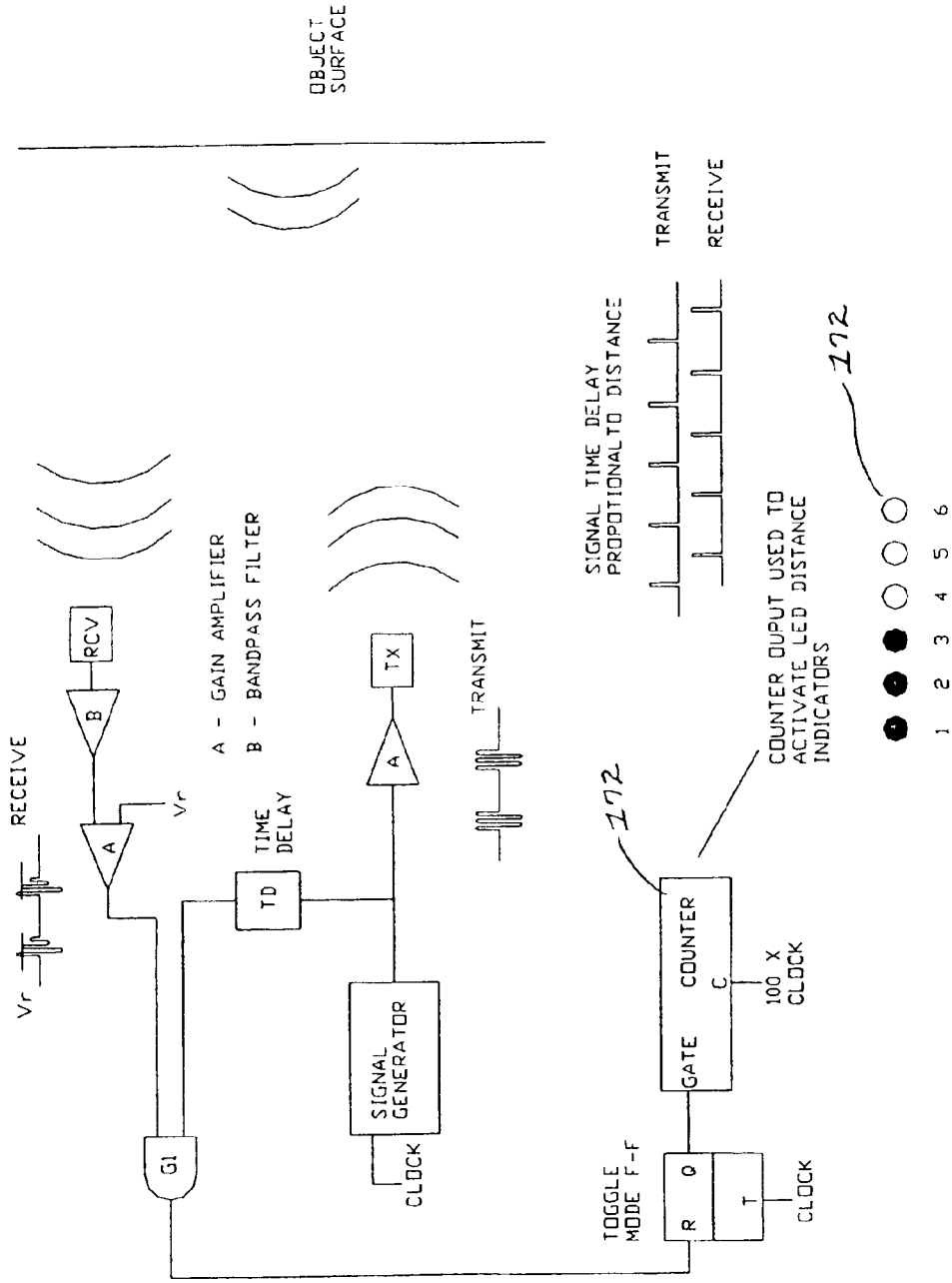
FIG. 8 is an electrical schematic diagram of the invention further comprising an ultrasonic distance measurement device for providing the driver with the distance between the vehicle hitch and the trailer tow hitch.
Figure 9:
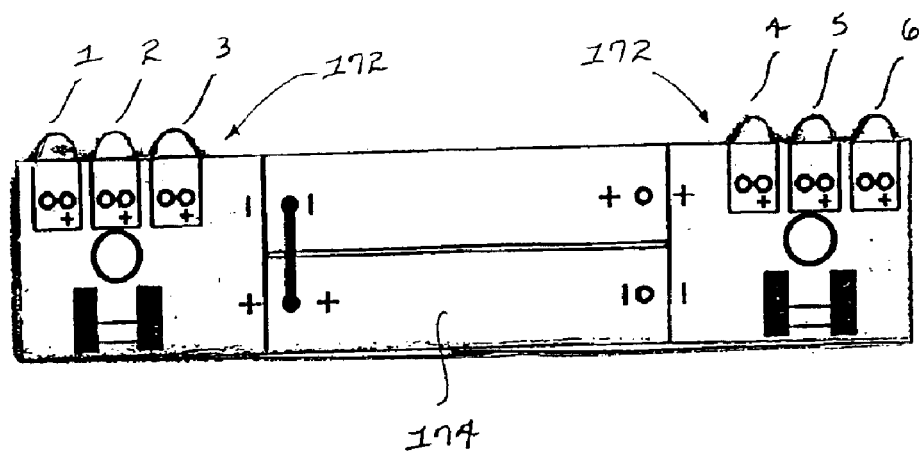
FIG. 9 is an electronic diagram depicting the light emitting diode indicators of distance measurement which is powered by a local power source.
Figure 10:
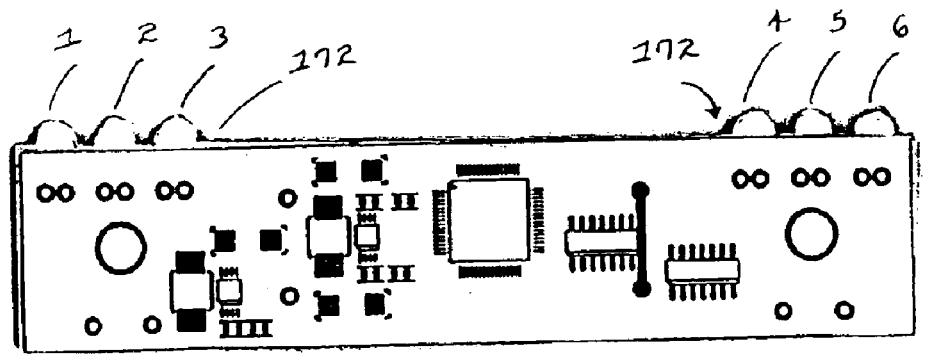
FIG. 10 is one possible layout of an electronic circuit board of the ultrasonic distance measurement device for activation of the light emitting diode distance indicators.

As an alternative enhancement, the electronic back-up alignment apparatus 20 described herein may include a device for measuring the distance between the vehicle and the trailer 30, in the same manner as the sonar or anti-collision, except using an ultrasonic system as illustrated in FIG. 8. The ultrasonic system is provided with pulse counting indicators 172. Preferably, the counting indicators 172 value activates the light emitting diodes represented by numbers 1 through 6. The number 1 represents to the user that the vehicle is approaching the trailer 30. As the vehicle continues to get closer to the trailer 30, the next light emitting diode number 2 is activated. When the vehicle continues to get even closer, the light emitting diode number 3 is activated. This continues with light emitting diode numbers and 5 until the vehicle finally reaches the trailer 30 as light emitting diode number 6 is activated. In this manner, the light emitting diode counting indicators 172 provide the user with a visual indication of how close the vehicle is to the trailer 30. The light emitting diode numbers are affixed to the electronic back-up alignment apparatus 20 for viewing by the user as depicted in FIG. 9. A battery 174 powers the counting indicators 172 by a light emitting diode circuit. The electronic circuit board of the ultrasonic system and activates the light emitting diode numbers is illustrated in FIG. 10.

Thus, there has been provided an electronic back-up alignment apparatus that utilizes a light emitting source coacting with a free rotating mirror assembly for providing a directional beam which is visible by the driver for aligning the hitch of a vehicle in relation to the tow hitch of a trailer. While the invention has been described in conjunction with a specific embodiment, it is evident that many alternatives, modifications and variations will be apparent to those skilled in the art in light of the foregoing description. Accordingly, it in intended to embrace all such alternatives, modifications and variations as fall within the spirit and scope of the appended claims.

What is claimed is:

1. An apparatus for aligning a vehicle hitch mounted on a vehicle to a tow hitch of a trailer, comprising:

means for emitting a light beam;

means for securing the means for emitting the light beam to the vehicle, means for energizing the means for emitting the light beam;

a reflective member; and means for receiving the light beam from the means for emitting the light beam and reflecting the light beam from the reflective member toward the trailer for forming a tow hitch alignment point on the trailer for aligning the vehicle hitch to the tow hitch.

2. The apparatus of claim 1 wherein the means for emitting the light beam is a laser pointer, the laser pointer having an elongated body having a light source actuator and an opening in the elongated body to allow the light beam to exit the elongated body.

3. The apparatus of claim 2 wherein the light source actuator is located along the exterior of the elongated body and, upon depression of the light source actuator into the elongated body, the light source actuator activates the means for emitting the light beam for releasing the light beam through the opening and into the means for receiving the light beam.

4. The apparatus of claim 1 wherein the means for securing the means for emitting the light beam to the vehicle is a housing, the housing having a column for receiving the means for emitting the light beam.

5. The apparatus of claim 4 and further comprising magnets mounted on the housing for securing the housing to the vehicle.

6. The apparatus of claim 4 wherein the means for energizing the means for emitting the light beam is a slip ring, the slip ring forming a portion of the column that covers the exterior of the means for emitting the light beam, the slip ring traversing the exterior of the means for emitting the light beam and depressing the light source actuator into the elongated body of the means for emitting the light beam.

7. The apparatus of claim 1 wherein the means for receiving the light beam from the means for emitting the light beam comprises a gravity orientation balancer and a pair of wheels, the orientation balancer and the pair of wheel enabling the light beam reflecting from the reflective member to be maintained in a horizontal plane.

8. The apparatus of claim 7 wherein the gravity orientation balancer has a top surface further defining a channel therein, a bottom surface, and a pair of arms.

9. The apparatus of claim 7 wherein the reflective member is frictionally received into the channel of the gravity orientation balancer.

10. The apparatus of claim 9 wherein the reflective member forms an angle to the light beam released from the means for emitting the light beam.

11. The apparatus of claim 10 wherein the angle is substantially forty-five degrees.

12. The apparatus of claim 7 wherein the wheels have a center tube and an outer tube, the center tube separated from the outer tube by a plurality of ball bearings with dividers placed between each of the plurality of ball bearings, the center tube further defining a hollow opening.

13. The apparatus of claim 12 wherein each arm of the gravity orientation balancer is fixedly secured within the hollow opening of the center tube of a corresponding wheel.

14. The apparatus of claim 7 wherein the gravity orientation balancer, the reflective member, and the pair of wheels are housed within a hollow, transparent tube closed on one end by an end cap and secured to the housing by a connection member on the other end.

15. The apparatus of claim 1 and further comprising an anti-collision device for measuring the distance between the vehicle and the trailer.

16. The apparatus of claim 1 and further comprising an ultrasonic device for measuring the distance between the vehicle and the trailer.

17. The apparatus of claim 16 wherein the ultrasonic device has a plurality of light emitting diode indicators, the plurality of light emitting diode indicators each representing a different distance to the trailer and providing the user an indication of how close the vehicle is to the trailer.

18. An apparatus for aligning a vehicle hitch mounted on a vehicle to a tow hitch of a trailer, comprising:

means for emitting light, the means for emitting light generating a light beam for producing a virtual tow point on the trailer;

means for automatically maintaining the means for emitting light and the light beam in a horizontal plane; and a housing for securing the means for emitting light and the means for automatically maintaining the means for emitting light to the vehicle.

19. The apparatus of claim 18 and further defining a means for energizing the means for emitting light.

20. The apparatus of claim 19 wherein means for energizing the means for emitting light is a switch.

21. The apparatus of claim 18 wherein the means for automatically maintaining the means for emitting light and the light beam in a horizontal plane comprises a free rotating mirror assembly for receiving the light beam generated from the means for emitting light and redirecting the light beam from the vehicle towards the trailer, the free rotating mirror assembly having an orientation balancer, a mirror, and a pair of wheels.

22. The apparatus of claim 21 wherein the orientation balancer has a top surface further defining a channel therein, a bottom surface, and a pair of arms.

23. The apparatus of claim 21 wherein the mirror is frictionally received into the channel of the orientation balancer.

24. The apparatus of claim 23 wherein the mirror forms an angle to the light released from the means for emitting light.

25. The apparatus of claim 24 wherein the angle is substantially forty-five degrees.

26. The apparatus of claim 21 wherein the wheels have a center tube and an outer tube, the center tube separated from the outer tube by a plurality of ball bearings with dividers placed between each of the plurality of ball bearings, the center tube further defining a hollow opening.

27. The apparatus of claim 26 wherein each arm of the orientation balancer is fixedly secured within the hollow opening of the center tube of a corresponding wheel.

* * * * *